(12) United States Patent
Li et al.

(10) Patent No.: US 12,444,964 B2
(45) Date of Patent: Oct. 14, 2025

(54) POWER SUPPLY SYSTEM, VEHICLE AND POWER SUPPLY METHOD

(71) Applicants: CONTEMPORARY AMPEREX TECHNOLOGY CO., LIMITED, Ningde (CN); Contemporary Amperex Intelligence Technology (Shanghai) Limited, Shanghai (CN)

(72) Inventors: Bao Li, Shanghai (CN); Chuanhui Zhang, Shanghai (CN)

(73) Assignees: CONTEMPORARY AMPEREX TECHNOLOGY CO., LIMITED, Ningde (CN); CONTEMPORARY AMPEREX INTELLIGENCE TECHNOLOGY (SHANGHAI) LIMITED, Shanghai (CN)

( * ) Notice: Subject to any disclaimer, the term of this patent is extended or adjusted under 35 U.S.C. 154(b) by 0 days.

(21) Appl. No.: 18/979,370

(22) Filed: Dec. 12, 2024

(65) Prior Publication Data

US 2025/0112482 A1     Apr. 3, 2025

Related U.S. Application Data

(63) Continuation of application No. PCT/CN2022/126506, filed on Oct. 20, 2022.

(51) Int. Cl.
*H02J 7/00* (2006.01)
*B60R 16/033* (2006.01)
*H02J 7/02* (2016.01)

(52) U.S. Cl.
CPC .......... *H02J 7/0063* (2013.01); *B60R 16/033* (2013.01); *H02J 7/02* (2013.01); *B60Y 2300/60* (2013.01); *H02J 2310/40* (2020.01)

(58) Field of Classification Search
CPC ........ H02J 7/0063; H02J 7/02; H02J 2310/40; B60R 16/033; B60Y 2300/60
(Continued)

(56) References Cited

U.S. PATENT DOCUMENTS 9,481,256 B2 * 11/2016 Arkus .................... B60L 53/00
11,021,073 B1   6/2021 Gauthier et al.
(Continued)

FOREIGN PATENT DOCUMENTS

CN      205022357 U    2/2016
CN      108215918 A    6/2018
(Continued)

OTHER PUBLICATIONS

The World Intellectual Property Organization (WIPO) International Search Report for PCT/CN2022/126506 Dec. 27, 2022 4 Pages (including translation).

(Continued)

*Primary Examiner* — Michael R. Fin
(74) *Attorney, Agent, or Firm* — ANOVA LAW GROUP, PLLC (57) ABSTRACT

A power supply system includes a charger supporting an alternating current/direct current bidirectional conversion, a battery, an electrical converter and an electrical apparatus. The charger is electrically connected with both the battery and the electrical apparatus, and the battery is electrically connected with the electrical apparatus through the electrical converter.

15 Claims, 2 Drawing Sheets

(58) Field of Classification Search
USPC .......................................................... 307/10.1
See application file for complete search history.

(56) References Cited

U.S. PATENT DOCUMENTS

| | | | |
|---|---|---|---|
| 11,433,780 B2* | 9/2022 | Ukai | B60L 58/24 |
| 11,613,184 B1* | 3/2023 | Wiegman | B60L 53/62 |
| | | | 320/108 |
| 2016/0311332 A1* | 10/2016 | Jang | H02M 3/158 |
| 2017/0320396 A1 | 11/2017 | Kim et al. | |
| 2019/0337403 A1* | 11/2019 | Tanaka | H01M 8/04228 |
| 2020/0070661 A1* | 3/2020 | Akuzawa | B60L 3/0023 |
| 2021/0276425 A1* | 9/2021 | Gauthier | H02J 7/0063 |
| 2022/0131398 A1 | 4/2022 | Herranz et al. | |
| 2022/0209543 A1 | 6/2022 | Lee et al. | |
| 2023/0001869 A1* | 1/2023 | Gronau | H02M 3/003 |

FOREIGN PATENT DOCUMENTS

| | | |
|---|---|---|
| CN | 110614930 A | 12/2019 |
| CN | 108973903 B | 9/2020 |
| CN | 113949282 A | 1/2022 |
| CN | 114954313 A | 8/2022 |
| WO | 2015165629 A1 | 11/2015 |

OTHER PUBLICATIONS

The European Patent Office (EPO) The Extended European Search Report for Application No. 22962412.7 Aug. 18, 2025 9 Pages.

* cited by examiner

POWER SUPPLY SYSTEM, VEHICLE AND POWER SUPPLY METHOD

CROSS-REFERENCE TO RELATED APPLICATION

This application is a continuation of International Application No. PCT/CN2022/126506, filed on Oct. 20, 2022, which is incorporated herein by reference in its entirety.

TECHNICAL FIELD

The present disclosure relates to the field of power supply technology, and more particularly, to a power supply system, a vehicle and a power supply method.

BACKGROUND

If components of a vehicle lose power, a driving function of the vehicle will not work properly, thereby easily resulting in danger. In order to ensure the safe driving of the vehicle, the number of backup batteries is increased to improve the reliability of the on-board power supply.

However, a small capacity of a backup battery makes the power supply run for a short time, resulting in a low reliability of power supply.

SUMMARY

The present disclosure provides a power supply system, a vehicle and a power supply method capable of improving the reliability of power supply.

In a first aspect, embodiments of the present disclosure provide a power supply system, including: a charger, a battery, an electrical converter and an electrical apparatus; the charger being electrically connected with both the battery and the electrical apparatus; and the battery being electrically connected with the electrical apparatus through the electrical converter.

In the power supply system of the embodiments of the present disclosure, when the electrical converter fails, the battery can supply power to the electrical apparatus through the charger, which can ensure that the battery continues to supply power to the electrical apparatus, so as to improve running time of the power supply and improve the reliability of the power supply.

In some embodiments, the battery, the electrical converter and the electrical apparatus form a first power supply circuit; and the battery, the charger and the electrical apparatus form a second power supply circuit.

The power supply system of the embodiments provides the first power supply circuit and the second power supply circuit. When one of the power supply circuits fails, the other of the power supply circuits can supply power, thus the reliability of the on-board power supply can be improved.

In some embodiments, the electrical apparatus includes a first controller and a second controller for controlling a steering motor;
the first controller is electrically connected with the electrical converter; and
the second controller is electrically connected with the charger.

In the power supply system of the embodiments, the electrical converter and the charger are arranged to be respectively connected to different controllers for controlling the steering motor to realize a decoupling of the controllers, thereby improving the control reliability of the steering motor.

In some embodiments, the battery, the electrical converter and the first controller form the first power supply circuit; and the battery, the charger and the second controller form the second power supply circuit.

The power supply system of the embodiments can realize the decoupling of the controllers in different power supply circuits, to improve the control reliability of the steering motor.

In some embodiments, the second power supply circuit is in an opened state when the first power supply circuit is closed; and the second power supply circuit is in an closed state when the first power supply circuit is opened.

In the power supply system of the embodiments, the state of the second power supply circuit is determined based on the state of the first power supply circuit, so one power supply circuit can be closed at any time to improve the reliability of the on-board power supply.

In some embodiments, the first power supply circuit is opened due to a fault of the electrical converter.

In the power supply system of the embodiments, when the electrical converter fails, the battery can supply power to the electrical apparatus through the charger to improve the reliability of power supply.

In some embodiments, the charger outputs an alternating current of 110 volts, 220 volts or 380 volts, when the second power supply circuit is closed.

In some embodiments, an alternating current output power of the charger is greater than an output power of the electrical converter.

In the power supply system of the embodiments, for the steering motor with a demand for large power, the power demand of the steering motor can be met even if it is powered by the charger, to improve the reliability of power supply.

In some embodiments, the power supply system further includes a distribution box; and the charger is electrically connected with the electrical apparatus through the distribution box.

In the power supply system of the embodiments, the charger and the electrical apparatus can be connected or disconnected to each other by changing the operating state of the distribution box, to improve the control flexibility of the power supply system.

In some embodiments, the power supply system further includes a backup battery, and the backup battery is electrically connected with both the electrical converter and the electrical apparatus.

In the power supply system of the embodiments, when the electrical converter fails, the backup battery can supply power, thereby further improving the reliability of the on-board power supply.

In some embodiments, the backup battery outputs a direct current of 12 volts or 24 volts.

In some embodiments, when the charger is connected with an alternating current power source, the alternating current power source charges the battery and the backup battery.

In the power supply system of the embodiments, the charger can convert an alternating current into a direct current to charge the battery and the backup battery, thereby prolonging the service life of the power supply system.

In some embodiments, an on-board charging system further includes a backup electrical converter, and the backup electrical converter is electrically connected with both the battery and the electrical apparatus.

In the power supply system of the embodiments, when the electrical converter fails, the battery can supply power through the backup electrical converter, thereby further improving the reliability of the on-board power supply.

In some embodiments, the power supply system is configured as an on-board power supply system, and the charger is configured as an on-board charger.

In a second aspect, embodiments of the present disclosure provide a vehicle, including the power supply system of the first aspect.

In the vehicle of the embodiments of the present disclosure, because the power supply system can improve the reliability of the on-board power supply, the use safety of the vehicle can be improved.

In a second aspect, embodiments of the present disclosure provide a power supply method for the vehicle of the second aspect, including:
  obtaining a current target state of the electrical converter;
  controlling the battery to supply power to the electrical apparatus through a target apparatus;
  wherein when the target state is a normal operating state, the target apparatus is configured as the electrical converter; and when the target state is an abnormal operating state, the target device is configured as the charger.

In the power supply method of the embodiments of the present disclosure, when the electrical converter does not fail, the battery can also supply power to the electrical apparatus through the electrical converter. When the electrical converter fails, the battery can supply power to the electrical apparatus by the charger. It can be seen that the battery can supply power to the electrical apparatus regardless of the state of the electrical converter, which can improve the reliability of power supply.

In some embodiments, the method further includes:
  when the charger is detected to be not connected to an alternating current power source, controlling the charger to be in the first operating state;
  wherein in the first operating state, the charger is used for converting a direct current into an alternating current.

In the power supply method of the embodiments, when the charger is not connected to a current power source, the charger is controlled in advance to enter the first operating state. Thus when the battery needs to supply power to the user's apparatus through the charger, the charger can be directly used to supply power to the electrical apparatus, to improve the efficiency of power supply.

In a fourth aspect, embodiments of the present disclosure provide an electronic device, including:
  a processor and a memory that stores programs or instructions, wherein the processor executes the programs or instructions to implement the above method.

In a fifth aspect, embodiments of the present disclosure provide a readable storage medium, wherein programs or instructions are stored on the readable storage medium, and the programs or instructions are executed by a processor to implement the above method.

In a sixth aspect, the embodiments of the present disclosure provide a computer program product, wherein instructions in the computer program product are executed by the processor of the electronic device to implement the method.

The above description is only an overview of the technical solution of the present disclosure, and in order to be able to understand more clearly the technical means of the present disclosure, it can be implemented in accordance with the contents of the description, and in order to make the above and other purposes, characteristics and advantages of the present disclosure more obvious and easy to understand, specific embodiments of the present disclosure are listed below.

BRIEF DESCRIPTION OF THE DRAWINGS

In order to illustrate more clearly technical solutions of embodiments of the present disclosure, drawings that need to be used in embodiments of the present disclosure will be briefly introduced below. It is obvious that the drawings described below are only some embodiments of the present disclosure, and for those skilled in the art, other drawings can also be obtained according to the drawings without creative labor.

DETAILED DESCRIPTION

In order to make purposes, technical solutions and advantages of embodiments of the present disclosure more clear, the technical solutions in embodiments of the present disclosure will be described clearly. Obviously, embodiments described are part, and not all of embodiments of the present disclosure. Based on embodiments in the present disclosure, all other embodiments obtained by those skilled in the field without creative work shall fall within the scope of protection in the present disclosure.

Unless otherwise defined, all technical and scientific terms used in the present disclosure have the same meaning as those normally understood by those skilled in the art. In the present disclosure, terms used in the description of the present disclosure are for purposes of describing specific embodiments only and are not intended to restrict the present disclosure. Terms "including" and "having" and any variation thereof in the description, claims and the above drawings of the present disclosure are intended to cover non-exclusive inclusion. Terms "first", "second", etc. in the description and claims or in the above drawings of the present disclosure are used to distinguish between different objects and are not used to describe a particular order or primary or secondary relationship.

Reference to "embodiments" in the present disclosure means that a particular feature, structure or characteristic described in conjunction with embodiments may be included in at least one embodiment of the present disclosure. The presence of the phrase at various positions in the specification does not necessarily refer to the same embodiment, nor is it a separate or alternative embodiment that is mutually exclusive with other embodiments.

In the description of the present disclosure, it should be noted that, unless otherwise stated or defined, terms "installation", "connected to", "connected with", "attachment" and the like are to be understood broadly, and may be, for example, a fixed connection, a detachable connection, or an integral connection; a direct connection or an indirect connection through an intermediate medium or an internal communication between two elements. The specific meaning of the above terms in the present disclosure can be understood by those skilled in the art according to actual circumstance.

The term "and/or" in the present disclosure is only an association relationship describing associated objects, indicating that there can be three kinds of relationships, for example, A and/or B, can mean: there is A alone, there is A and B simultaneously, and there is B alone. In addition, the character "/" in the present disclosure generally indicates that the associated objects are in an "or" relationship.

In embodiments of the present disclosure, the same reference sign represents the same parts, and for brevity, a detailed description of the same part is omitted in different embodiments. It is understood that the thickness, length, width, etc. of various components in embodiments of the present disclosure as illustrated and the overall thickness, length, width, etc. of an integrated device are illustrative only and should not constitute any limitation to the present disclosure.

The term "a plurality of" as used in the present disclosure means more than two (including two).

In the present disclosure, the battery may be a battery pack, specifically a battery pack with the high voltage. The battery pack may include at least one battery cell, and the battery cell may include a lithium-ion secondary battery cell, a lithium-ion primary battery cell, a lithium-sulfur battery cell, a sodium-lithium-ion battery cell, a sodium-ion battery cell, or a magnesium-ion battery cell, etc., and embodiments of the present disclosure are not limited thereto. The battery cell may be in the form of a cylinder, a flat body, a cuboid or other shapes, etc., and the embodiments of the present disclosure are not limited thereto.

Figure 1:
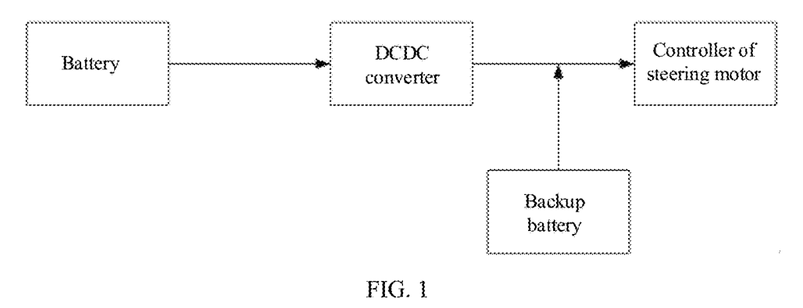
FIG. 1 is a schematic structural diagram of a power supply system in the related art.

In the related art, a power supply system of a steer-by-wire system is shown in FIG. 1, and a battery supplies power to a controller of a steering motor through a direct current-to-direct current (DCDC) converter. In the event of a failure in the DC/DC converter, a backup battery can be used as a backup power source for the controller for the steering motor. However, the capacity of the backup battery is small, and the power will be exhausted after a period of time, and the power supply will be unable to continue to supply power, thus the running time of the on-board power supply is short.

Based on the above-mentioned problems found by the applicant, embodiments of the present disclosure provide a power supply system, a vehicle and a power supply method to improve the reliability of the power supply.

Figure 2:
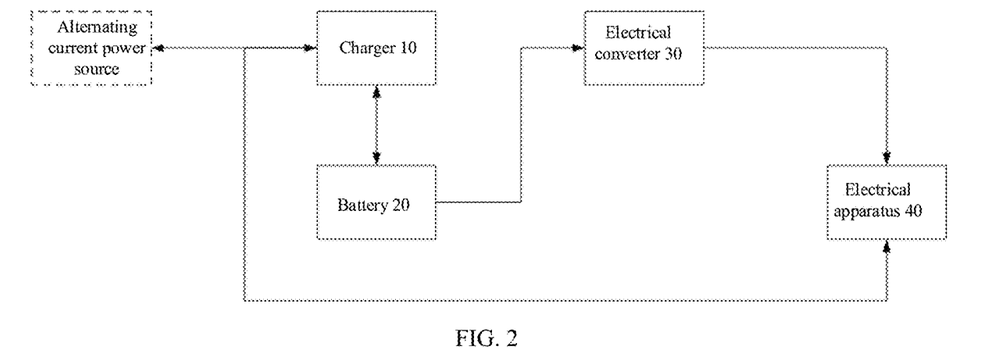
FIG. 2 is a first structural schematic diagram of a power supply system provided in embodiments of the present disclosure.

As shown in FIG. 2, the power supply system of the embodiments of the present disclosure may include: a charger 10, a battery 20, an electrical converter 30 and an electrical apparatus 40. The charger 10 is electrically connected with both the battery 20 and the electrical apparatus 40. The battery 20 is electrically connected with the electrical apparatus 40 through the electrical converter 30.

In the embodiments of the present disclosure, the electrical converter 30 can be used to convert the electrical signal. In some embodiments, the electrical converter 30 may be a DCDC converter, but it is not limited thereto.

The charger 10 supports the alternating current/direct current bidirectional conversion. That is, the alternating current can be converted to the direct current, and the direct current can also be converted to the alternating current.

In specific realization, when the electrical apparatus 40 needs to be supplied with power through the on-board charger 10, the charger 10 can be in a first operating state, and the direct current output by the battery 20 is converted into a target high-voltage alternating current to supply power to the electrical apparatus 40.

When the charger 10 is connected to the alternating current power source, the charger 10 can be in a second operating state, and the alternating current output by the alternating current power source is converted into a target high-voltage direct current to charge the battery 20.

Because the charger 10 supports the alternating current/direct current bidirectional conversion, when the electrical converter 30 fails, the battery 20 can supply power to the electrical apparatus 40 through the charger 10, and it can be ensured that the battery 20 can continue to supply power to the electrical apparatus 40, thus the running time of the power supply can be improved, and the reliability of the power supply is improved.

In some embodiments, the battery 20, the electrical converter 30 and the electrical apparatus 40 may form a first power supply circuit. The battery 20, the charger 10 and the electrical apparatus 40 can form a second power supply circuit.

In the first power supply circuit, the battery 20 supplies power to the electrical apparatus 40 through the electrical converter 30.

In the second power supply circuit, the battery 20 supplies power to the electrical apparatus 40 through the charger 10.

In this embodiment, the power supply system provides the first power supply circuit and the second power supply circuit, and when one of the power supply circuits fails, the other of the power supply circuits can supply power, the reliability of the on-board power supply can be improved.

In the embodiment of the present disclosure, the electrical apparatus 40 may be any apparatus that needs to be supplied with power. In some embodiments, the electrical apparatus 40 may be a controller for controlling the steering motor.

In an optional embodiment, the electrical apparatus 40 may include only one controller.

Figure 3:
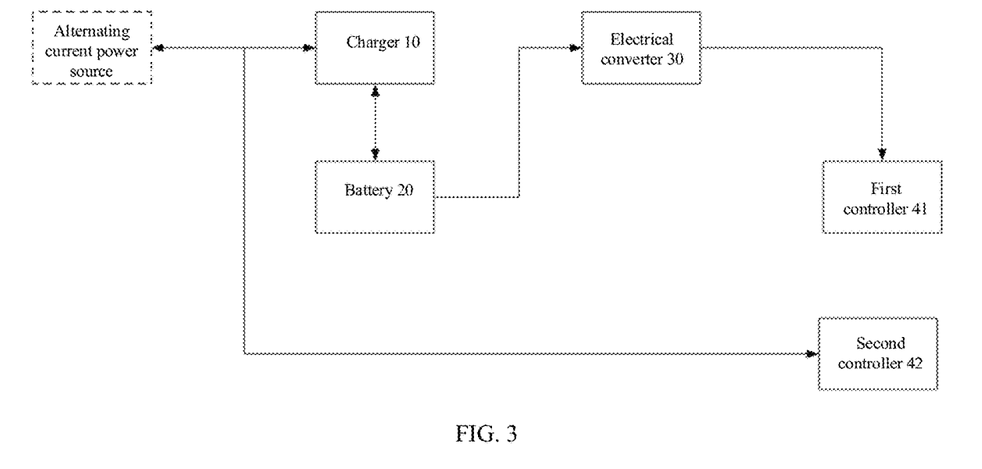
FIG. 3 is a second structural schematic diagram of a power supply system provided in embodiments of the present disclosure.

In some other optional embodiments, as shown in FIG. 3, the electrical apparatus 40 may include a first controller 41 and a second controller 42. The first controller 41 is electrically connected with the electrical converter 30. The second controller 42 is electrically connected with the charger 10.

In the power supply system shown in FIG. 3, the battery 20, the electrical converter 30 and the first controller 41 form the first power supply circuit. The battery 20, the charger 10 and the second controller 42 form the second power supply circuit.

In the first power supply circuit, the battery 20 supplies power to the first controller 41 through an electrical converter 30. The first controller 41 supplies power by the direct current.

In the second power supply circuit, the battery 20 supplies power to the second controller 42 through the charger 10. The second controller 42 supplies powered by the alternating current.

By the electrical converter 30 and the charger 10 arranged to be connected with different controllers, the controllers of the steering motor can be decoupled, thus when one controller fails, the control of the steering motor can be realized through the other controller, thereby further improving the control reliability of the steering motor.

In some embodiments, the first power supply circuit may be used as a primary power supply circuit, and the second power supply circuit may be used as a backup power supply circuit, i.e., a redundant power supply circuit. In this embodiment, under normal operating conditions, the first power supply circuit is closed; and when the first power supply circuit fails, the second power supply circuit is closed.

In other embodiments, the second power supply circuit may be used as the primary power supply circuit, and the first power supply circuit may be used as the backup power supply circuit. In this embodiment, under normal operating conditions, the second power supply circuit is closed; and when the second power supply circuit fails, the first power supply circuit is closed.

In some embodiments, the second power supply circuit is opened when the first power supply circuit is closed. The second power supply circuit is closed when the first power supply circuit is open.

In some optional embodiments, when the first power supply circuit is closed, the battery 20 can stop outputting the direct current to the charger 10 and thus the second power supply circuit is open. When the first power supply circuit is open, the battery 20 can output the direct current to the charger 10 and thus the second power supply circuit is closed. In this embodiment, the first power supply circuit can be closed or opened by changing the operating state of the battery 10.

Figure 4:
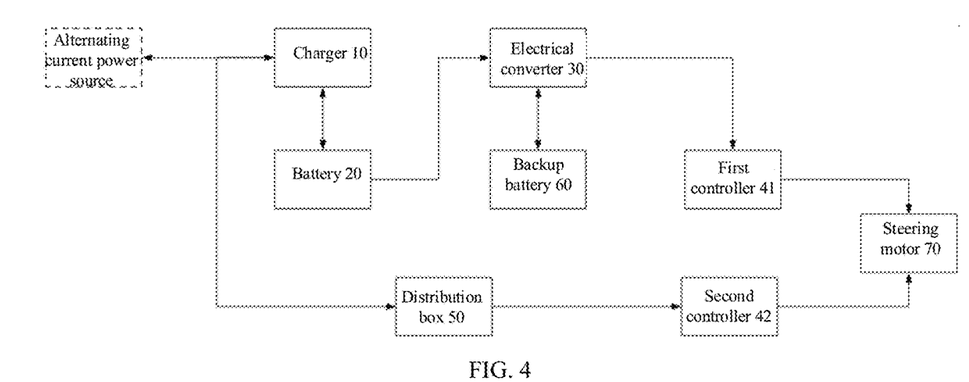
FIG. 4 is a third structural schematic diagram of a power supply system provided in embodiments of the present disclosure.

In some other optional embodiments, as shown in FIG. 4, the power supply system may also include a distribution box 50. The charger 10 is electrically connected with the electrical apparatus 40 by the distribution box 50. Further, for the power supply system shown in FIG. 3, the distribution box 50 is electrically connected with the second controller 42. In this embodiment, when the first power supply circuit is closed, the distribution box 50 can be controlled not to connect the distribution box 50 and the second controller 42 to open the second power supply circuit. When the second power supply circuit is closed, the distribution box 50 can be controlled to connect the charger 10 and the second controller 42 to close the second power supply circuit. In this embodiment, the second power supply circuit can be closed or opened by changing the operating state of the distribution box 20.

In this embodiment, the state of the second power supply circuit is determined based on the state of the first power supply circuit, thus one power supply circuit can be closed at any time, thus the reliability of the on-board power supply can be improved.

In some embodiments, the first power supply circuit may be opened due to the fault of the electrical converter 30. Further, for the power supply system shown in FIG. 3, the first power supply circuit may also be opened due to the fault of the first controller 41.

That is, when the electrical converter 30 and/or the first controller 41 fails, the battery 20 can supply power through the charger 10, thus the reliability of the power supply can be improved.

In some embodiments, the charger 10 outputs the alternating current of 110 volts, 220 volts or 380 volts while the second power supply circuit is on.

In practical application, the volt value of the alternating current specifically output by the charger 10 is determined based on the demand of the electrical apparatus 40, to satisfy the electrical demand of the electrical apparatus 40.

In some embodiments, the alternating current output power of the charger 10 can be greater than the output power of the electrical converter 30. In this way, for the electrical apparatus 40 demanded for the large power, even if the charger 10 supplies power, the power demand of the electrical apparatus 40 can be satisfied, to improve the reliability of power supply.

In the scene that the power demand of the electrical apparatus 40 is larger, and the alternating current output power of the charger 10 is greater than the output power of the electrical converter 30, the second power supply circuit can be selected as the primary power supply circuit, and the first power supply circuit is used as the backup power supply circuit. Therefore the power demand of the whole vehicle to the electrical converter can be reduced, and the current in a low-voltage wiring harness can also be reduced at the same time, and the cost is saved.

In some embodiments, for the power supply system with the distribution box 50, further, the distribution box 50 may be electrically connected with other electrical devices other than the electrical apparatus 40. In this way, the alternating current output by the charger 10 can be used for not only supplying power to the electrical apparatus 40, but also can be used for supplying power to other electrical devices, thereby improving the flexibility of the power supply of the battery.

In some embodiments, as shown in FIG. 4, the power supply system may also include the backup battery 60, and the backup battery 60 is electrically connected with both the electrical converter 30 and the electrical apparatus 40.

The backup battery 60 is electrically connected with the electrical converter 30. Thus when the charger 10 is connected with the alternating current power source, the alternating current power source can charge the battery 20 and the backup battery 60.

The backup battery 60 is electrically connected with the electrical apparatus 40. And particularly, the backup battery 60 is electrically connected with the first controller 41. In this way, when the electrical converter 30 fails, the first controller 41 can be supplied with power by the backup battery 60, so the reliability of the power supply can be further improved.

In some embodiments, as shown in FIG. 4, the power supply system may also include a steering motor 70, and the steering motor 70 is electrically connected with both the first controller 41 and the second controller 42.

It should be noted that, for the power supply system shown in FIG. 4, when the first controller 41 fails, the battery 20 can supply power to the second controller 42 through the charger 10, and the steering motor is controlled through the second controller 42, to improve the control reliability of the steering motor.

When the electrical converter 30 fails, in some optional embodiments, the battery 20 can directly supply power to the second controller 42 through the charger 10, and the steering motor is controlled by the second controller 42. In other optional embodiments, the backup battery 60 can be used to supply power to the first controller 41, and the steering motor is controlled through the first controller 41. After the power of the backup battery 60 is exhausted, the battery 20 supply power to the second controller 42 through the charger 10, the steering motor is controlled by the second controller 42, to improve the control reliability of the steering motor.

In some embodiments, the backup battery 60 outputs the direct current of 12 volts or 24 volts.

In some embodiments, the on-board charging system further includes a backup electrical converter, and the backup electrical converter is electrically connected with both the battery 20 and the electrical apparatus 40. Further, for the on-board power supply system shown in FIG. 3, the backup electrical converter is electrically connected with the first controller 41. In this way, when the electrical converter 30 fails, the battery can supply power to the steering motor by the backup electrical converter and the first controller 41, to further improve the flexibility and reliability of the power supply.

The power supply system of the embodiments of the present disclosure may be applied to a vehicle, and can also be applied to other equipment that needs to be provided with a power supply system. When the power supply system is applied to the vehicle, the power supply system is specifically manifested as the on-board power supply system, and the charger is specifically manifested as the on-board charger (OBC).

It should be noted that, without conflict, the embodiments and the features in the embodiments in the present disclosure may be combined with each other.

Embodiments of the present disclosure also provide a vehicle, including the power supply system provided in the embodiments of the present disclosure to improve the safety of the vehicle in use.

Figure 5:
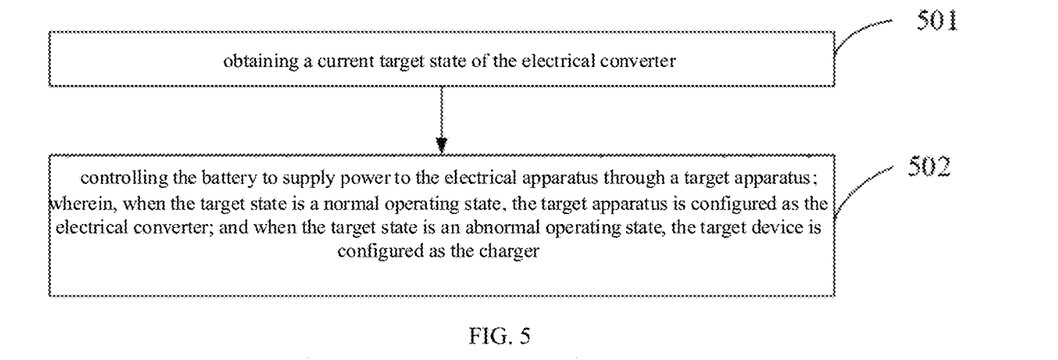
FIG. 5 is a schematic diagram of a flowchart of a power supply method provided in embodiments of the present disclosure.

Embodiments of the present disclosure also provide a power supply method for a vehicle provided in the embodiments of the present disclosure. As shown in FIG. 5, the power supply method can include the following steps:

step 501, obtaining a current target state of the electrical converter.

The state of the electrical converter can be normal or abnormal state. When the electrical converter is in the abnormal operating state, a fault occurs.

Step 502, the battery is controlled to supply power to the electrical apparatus through a target apparatus.

In the embodiments of the present disclosure, the target apparatus is the electrical converter or the charger, and the target apparatus is determined based on the target state. Specifically, when the target state is the normal operating state, the target apparatus is the electrical converter. In this case, the battery supplies power to the electrical apparatus through the electrical converter. And when the target state is the abnormal operating state, the target apparatus is the charger. In this case, the battery supplies power to the electrical apparatus through the charger.

In the power supply method of the embodiments of the present disclosure, when no fault occurs in the electrical converter, the battery can supply power to the electrical apparatus through the electrical converter, and when a fault occurs in the electrical converter, the battery can supply power to the electrical apparatus through the charger. It can be seen that the battery can supply power to the electrical apparatus regardless of the state of the electrical converter, to improve the reliability of the power supply.

The charger of the embodiments of the present disclosure may be in the first operating state and the second operating state. In the first operating state, the charger is used for converting the direct current into the alternating current and is suitable for a scene of the battery charging; in the second operating state, the charger is used for converting the alternating current into the direct current, and is suitable for a scene of the battery charging through the charger. Therefore, in some embodiments, the method further includes the following steps.

When the charger is detected not to be connected to the alternating current power source, the charger is controlled to be in the first operating state.

In the first operating state, the charger is used for converting the direct current into the alternating current.

The charger is not connected to the alternating current power source, indicating that it is not in the scene of the battery charging. Because there is a certain probability that the battery supplies power by the charger, the charger can be controlled in advance to enter the first operating state. Thus when the battery needs to supply power to the user's apparatus through the charger, the charger can be directly used to supply power to the electrical apparatus, thereby improving the efficiency of the power supply.

Of course, in other embodiments, the charger may be controlled to enter the first operating state only after it is determined that the target apparatus is the charger and before the battery is controlled to supply power to the electrical apparatus through the target apparatus.

In some embodiments, the target apparatus may also be the backup electrical converter when the power supply system also includes the backup electrical converter.

In some embodiments, when the power supply system also includes the backup battery, if the electrical converter is in the abnormal operating state, before the battery is controlled to supply power to the electrical apparatus through the charger, the electrical apparatus can be supplied with power through the backup battery, and when the power of the backup battery is less than a preset electrical power, the battery is controlled to supply power to the electrical apparatus through the charger, thereby further improving the reliability of the power supply.

Figure 6:
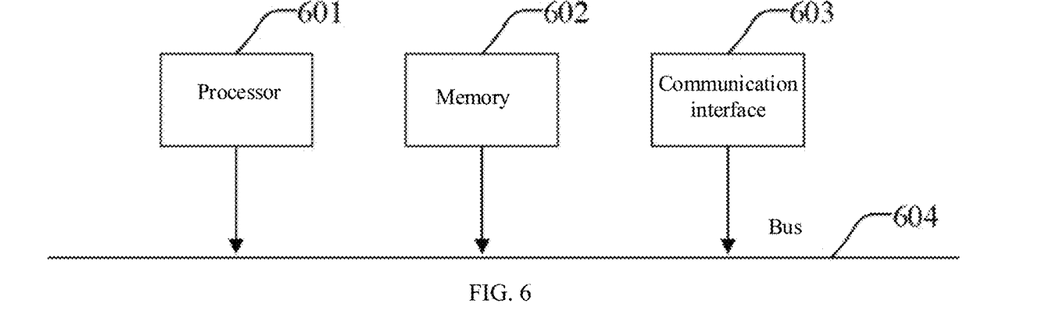
FIG. 6 is a schematic structural diagram of an electronic apparatus provided in embodiments of the present disclosure.

FIG. 6 shows a schematic diagram of a hardware structure of an electronic apparatus provided in one embodiment of the present disclosure.

An electronic apparatus may include a processor 601 as well as a memory 602 where programs or instructions are stored. The processor 601 implements the steps of the method in any of the above embodiments when executing the programs.

For example, the programs may be divided into one or more modules/units, and one or more modules/cells are stored in the memory 602 and executed by the processor 601 to complete the present disclosure. The one or more modules/units can be a series of program instruction segments that are capable of performing a specific function, and the instruction segments are used to describe the execution of the programs in the apparatus.

Specifically, the processor 601 may include a central processing unit (CPU), or an application specific integrated circuit (ASIC), or one or more integrated circuits that may be configured to implement the embodiment of the present disclosure.

The memory 602 can include mass memory for data or instructions. For example, rather than as a limitation, the memory 602 may include a hard disk drive (HDD), a floppy disk drive, a flash memory, an optical disc, a magneto-optical disk, a magnetic tape or a Universal Serial Bus (USB) drive, or a combination of two or more of these. Where appropriate, the memory 602 may include removable or non-removable (or fixed) media. When appropriate, the memory 602 can be inside or outside an integrated gateway disaster recovery device. In a particular embodiment, the memory 602 is a non-volatile solid-state memory.

The memory may include a read-only memory (ROM), a random access memory (RAM), a disk storage media device, an optical storage media device, a flash memory device, electrical, optical, or other physical/tangible memory storage devices. Thus, in general, the memory includes one or more tangible (non-transient) readable storage media (e.g., memory devices) encoded with software that includes computer executable instructions, and when the software is executed (e.g., by one or more processors), it operates to perform operations with reference to the methods described in accordance with one aspect of the present disclosure.

The processor 601 implements any of the above embodiments by reading and executing the programs or instructions stored in the memory 602.

In one example, the electronic apparatus may also include a communication interface 603 and a bus 604. The processor 601, the memory 602, and the communication interface 603 are connected through the bus 604 to complete the communication between each other.

The communication interface 603 is mainly used to realize the communication between respective module, device, unit and/or apparatus in the embodiment of the present disclosure.

The bus 604 includes hardware, software, or both to couple the components of an online data traffic billing device to each other. For example, rather than as a limitation, the bus may include an Accelerated Graphics Port (AGP) or other graphics buses, an Enhanced Industry Standard Architecture (EISA) bus, a Front Side Bus (FSB), a Hypertransport (HT) interconnection, an Industry Standard Architecture (ISA) bus, an unlimited bandwidth interconnection, a Low Pin Count (LPC) bus, a memory bus, a Wechat Architecture (MCA) bus, a Peripheral Component Interconnect (PCI) bus, a PCI-Express (PCI-X) bus, s Serial Advanced Technical Attachment (SATA) bus, a Video Electronics Standards Association Local (VLB) bus, or other suitable bus, or a combination of two or more of these. Where appropriate, the bus 604 may include one or more buses. Although the embodiment of the present disclosure describes and illustrates a particular bus, the present disclosure contemplates any suitable bus or interconnection.

In addition, in combination with the method in the above embodiments, embodiments of the present disclosure may provide a readable storage medium for realization. The programs or instructions are stored on the readable storage medium. The programs or instructions are executed by the processor to implement any of the above embodiments. The readable storage medium can be read by machines such as computers.

Embodiments of the present disclosure also provide a chip, and the chip includes a processor and a communication interface. The communication interface is coupled with the processor, the processor is used for running programs or instructions, to realize each process of the method in the above embodiments and achieve the same technical effect which are not described here to avoid repetition.

It should be understood that the chip referred to in the embodiment of the present disclosure may also be referred to as a system-on-chip, a chip of a system, a chip system or a chip of a system on chip, etc.

Embodiments of the present disclosure provide a computer program product that is stored in a readable storage medium, and the program product is executed by at least one processor to realize each process of the method in the above embodiments and to achieve the same technical effect which are not described here to avoid repetition.

It should be noted that, the present disclosure is not limited to the specific configuration and processes described above and shown in the drawings. For the sake of brevity, a detailed description of the known methods is omitted here. In the above embodiment, several specific steps are described and shown as examples. However, the methodological process of the present disclosure is not limited to the specific steps described and shown, and those skilled in the art may, after comprehending the gist of the present disclosure, make various changes, modifications and additions, or change the order between the steps.

Functional modules shown in the block diagram described above can be implemented as hardware, software, firmware, or a combination thereof. When implemented in hardware, it can be, for example, electronic circuits, application-specific integrated circuits (ASICs), appropriate firmware, plug-ins, function cards, and so on. When implemented in software, the elements of the present disclosure are programs or code segments that are used to perform required tasks. Programs or code segments can be stored on a machine-readable medium, or transmitted through a transmission medium or communication link through a data signal carried in a carrier. The "machine-readable media" can include any media capable of storing or transmitting information. Examples of the machine-readable media include electronic circuits, semiconductor memory devices, ROMs, flash memory, erasable ROMs (EROMs), floppy disks, CD-ROMs, optical discs, hard disks, fiber optic media, radio frequency (RF) links, and so on. Code segments can be downloaded via computer grids such as the Internet, Intranet, etc.

It should also be noted that the exemplary embodiments mentioned in the present disclosure describe some methods or systems based on a series of steps or apparatus. However, the present disclosure is not limited to the sequence of the above steps, that is, the steps may be executed in the order mentioned in the embodiments, or may be different from the order in the embodiments, or several steps may be executed simultaneously.

Various aspects of the present disclosure are described above with reference to the flowcharts and/or block diagrams of the method, apparatus (system) and program products according to the embodiments of the present disclosure. It should be understood that each box in the flowcharts and/or block diagrams and a combination of boxes in the flowcharts and/or block diagrams can be implemented by a computer program or instruction. These programs or instructions may be provided to the processor of a general-purpose computer, a specialized computer, or other programmable data processing device to produce a machine in which the instructions executed by the processor of the computer or other programmable data processing device enable the implementation of the functions/actions specified in one or more boxes of the flowcharts and/or block diagrams. Such a processor can be, but are not limited to, a general-purpose processor, a specialized processor, an application-specific processor, or a field-programmable logic circuit. It is also understood that each box in the block diagrams and/or flowcharts, and a combination of boxes in a block diagrams and/or flowcharts, may also be implemented by specialized hardware that performs a specified function or action, or by a combination of specialized hardware and computer instructions.

Although the present disclosure has been described with reference to some embodiments, various improvements may be made to it and parts therein may be replaced with equivalents without departing from the scope of the present disclosure. In particular, as long as there are no structural conflicts, the technical features mentioned in respective embodiments can be combined in any way. The present disclosure is not limited to the specific embodiments disclosed in the text, but includes all technical solutions that fall within the scope of the claims.

What is claimed is:

1. A power supply system, comprising: a charger, a battery, an electrical converter and an electrical apparatus;
   the charger being electrically connected with both the battery and the electrical apparatus;
   the battery being electrically connected with the electrical apparatus through the electrical converter;
   the electrical apparatus comprising a first controller and a second controller for controlling a steering motor;
   the first controller being electrically connected between the electrical converter and the steering motor; and
   the second controller being electrically connected between the charger and the steering motor;
   wherein:
      the battery, the electrical converter, and the first controller form a first power supply circuit; and
      the battery, the charger, and the second controller form a second power supply circuit.

2. The power supply system according to claim 1, wherein:
   the second power supply circuit is in an opened state when the first power supply circuit is closed; and
   the second power supply circuit is in a closed state when the first power supply circuit is opened.

3. The power supply system of claim 2, wherein the first power supply circuit is opened due to a fault of the electrical converter.

4. The power supply system of claim 1, wherein the charger outputs an alternating current of 110 volts, 220 volts or 380 volts.

5. The power supply system of claim 1, wherein an alternating current output power of the charger is greater than an output power of the electrical converter.

6. The power supply system of claim 1, further comprising:
   a distribution box;
   wherein the charger is electrically connected with the second controller through the distribution box.

7. The power supply system of claim 1, further comprising:
   a backup battery, electrically connected with both the electrical converter and the first controller.

8. The power supply system of claim 7, wherein the backup battery outputs a direct current of 12 volts or 24 volts.

9. The power supply system of claim 7, wherein when the charger is connected with an alternating current power source, the alternating current power source charges the battery and the backup battery.

10. The power supply system of claim 1, further comprising:
    a backup electrical converter, electrically connected with both the battery and the electrical apparatus.

11. The power supply system of claim 1, wherein the power supply system is configured as an on-board power supply system, and the charger is configured as an on-board charger.

12. A vehicle, comprising the power supply system of claim 1.

13. A power supply method for the vehicle of claim 12, comprising:
    obtaining a current target state of the electrical converter;
    controlling the battery to supply power to the electrical apparatus through a target apparatus;
    wherein:
       when the target state is a normal operating state, the target apparatus is configured as the electrical converter; and
       when the target state is an abnormal operating state, the target device is configured as the charger.

14. The power supply method of claim 13, further comprising:
    when the charger is detected to be not connected to an alternating current power source, controlling the charger to be in the first operating state;
    wherein, in the first operating state, the charger is used for converting a direct current into an alternating current.

15. A power supply system, comprising: a charger, a battery, an electrical converter, an electrical apparatus, and a distribution box;
    the charger being electrically connected with both the battery and the electrical apparatus;
    the battery being electrically connected with the electrical apparatus through the electrical converter;
    the electrical apparatus comprising a first controller and a second controller for controlling a steering motor;
    the first controller being electrically connected with the electrical converter;
    the second controller being electrically connected with the charger;
    the charger being electrically connected with the electrical apparatus through the distribution box; and
    the charger, the distribution box, the second controller, and the steering motor being connected in series in sequence;
    wherein:
       the battery, the electrical converter, and the first controller form a first power supply circuit; and
       the battery, the charger, and the second controller form a second power supply circuit.

* * * * *